United States Patent [19]

Lachocki

[11] 3,975,672

[45] Aug. 17, 1976

[54] POWER SUPPLY WITH MEANS TO REDUCE ON AND OFF SWITCHING TIMES OF SERIES REGULATED DEVICE

[75] Inventor: Eugene Lachocki, Turnersville, N.J.

[73] Assignee: RCA Corporation, New York, N.Y.

[22] Filed: Oct. 18, 1974

[21] Appl. No.: 516,097

[52] U.S. Cl. .............................. 323/17; 323/DIG. 1
[51] Int. Cl.² ........................ G05F 1/56; G05F 1/64
[58] Field of Search ......... 323/17, 22 T, 23, DIG. 1, 323/49; 321/18, 2

[56] References Cited
UNITED STATES PATENTS

| | | | |
|---|---|---|---|
| 3,350,629 | 10/1967 | Kirby | 323/DIG. 1 |
| 3,368,139 | 2/1968 | Wuerflein | 323/17 |
| 3,497,794 | 2/1970 | Fredrickson | 323/17 |
| 3,621,371 | 11/1971 | Brumm | 323/17 |
| 3,657,572 | 4/1972 | Millman | 323/DIG. 1 |
| 3,746,928 | 7/1973 | Eley et al. | 323/49 X |

*Primary Examiner*—Gerald Goldberg
*Attorney, Agent, or Firm*—E. M. Whitacre; Paul J. Rasmussen

[57] ABSTRACT

A regulated power supply having a plurality of series connected regulating elements. The state of current conduction of the plurality of regulating elements is controlled in response to the voltage appearing across the output terminals of the power supply. An energy storage device, connected between the regulating elements and one output terminal, is also provided. The energy storage device provides signals to the plurality of switching elements. These signals help to decrease the time required to switch the regulating elements on and off.

12 Claims, 1 Drawing Figure

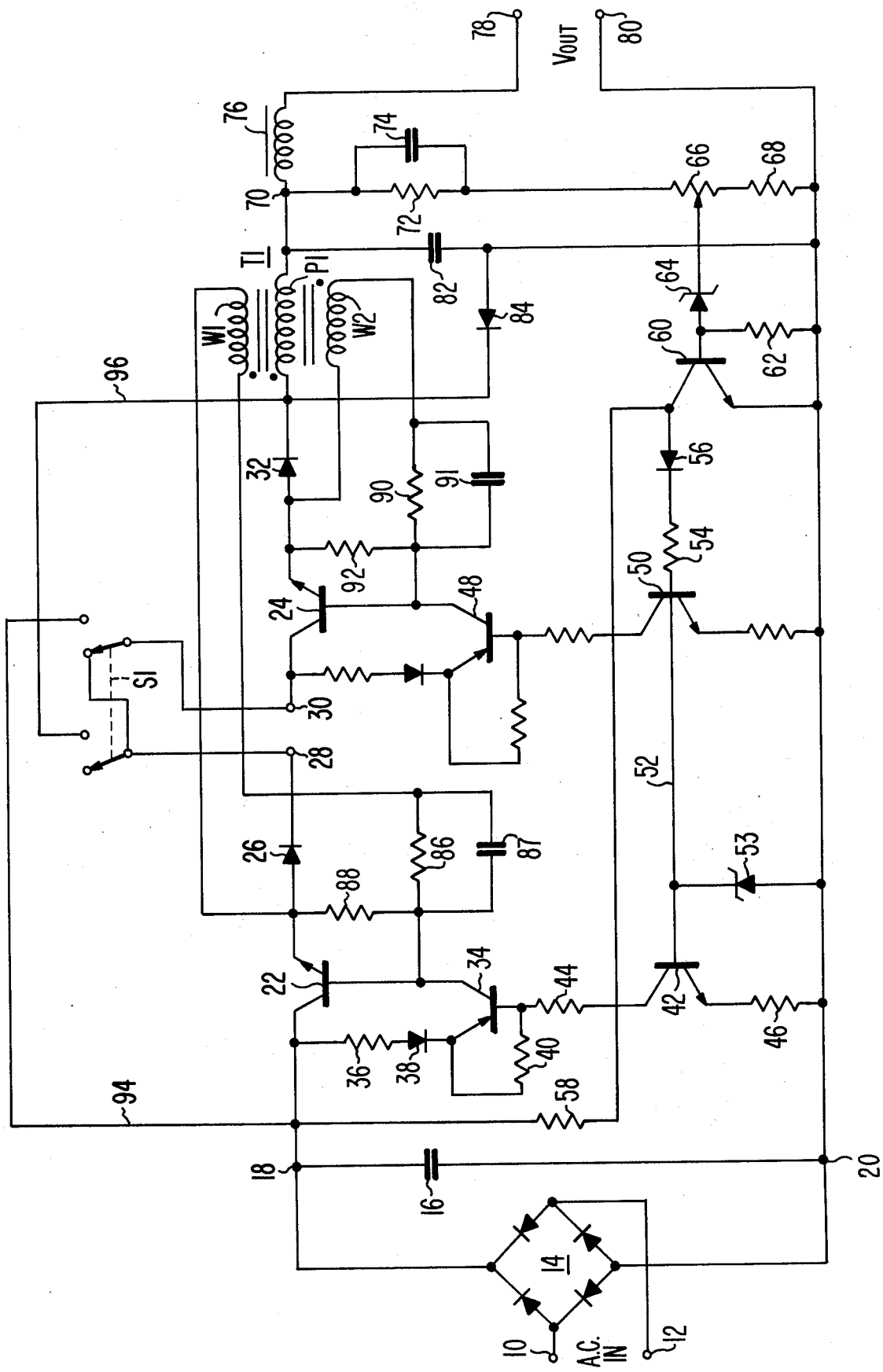

3,975,672

POWER SUPPLY WITH MEANS TO REDUCE ON AND OFF SWITCHING TIMES OF SERIES REGULATED DEVICE

FIELD OF INVENTION

The present invention relates generally to power supply circuits and more particularly to power supply circuits utilizing a plurality of regulating elements.

BACKGROUND OF THE INVENTION

In the prior art there are many instances where a plurality of regulating elements are utilized for providing a regulated voltage from an unregulated source of voltage. Generally, a plurality of regulating elements are connected in a series relationship with respect to one another in order to handle a relatively high unregulated input voltage. For example, in a series regulated power supply having two regulating elements connected in series with each other, the individual regulating elements, when placed in an on condition, will be subjected to approximately one-half of the applied unregulated input voltage. The problem with such an arrangement is that under certain conditions one of the two regulating elements may not turn on at exactly the same time as the other of the two regulating elements. Under these conditions, the regulating element which turns on second will be subjected to the full value of the applied unregulated input voltage. Unless the regulating elements are highly over-designed, it is very likely that the regulating element subjected to the full input voltage will burn out.

The present invention provides a technique whereby a plurality of regulating elements may be utilized in a power supply wherein circuitry is provided to ensure that all of the regulating elements turn on and turn off simultaneously. In addition, the present invention also provides a means for increasing the efficiency of the type of power supply described. These results are accomplished in a way which is not complex or costly to implement.

SUMMARY OF THE INVENTION

In accordance with the present invention a power supply is provided for obtaining a regulated voltage at a pair of output terminals. A pair of power supply input terminals are adapted for connection to a source of unregulated voltage. A plurality of series connected regulating devices are connected in circuit with one of the power supply input terminals. These regulating devices are operated to exhibit an on and an off state of current conduction. A first means is also provided between the power supply output terminals and the plurality of regulating devices. This first means is operable to simultaneously control the state of current conduction of the plurality of regulating devices for providing a predetermined regulated voltage at the power supply output terminals. A second means is connected between the plurality of regulating devices and one of the output terminals. This second means provides an individual signal to each one of the plurality of regulating devices for reducing the switching time of the plurality of regulating devices.

DETAILED DESCRIPTION

The sole FIGURE in the drawing is a schematic diagram of a preferred embodiment of the present invention.

Referring now to the sole FIGURE in the drawing, a source of AC signals (not shown) is applied to a pair of input terminals 10 and 12. In a practical example the AC signal may be 230 volts at a frequency anywhere between 40 and 400 hertz. In addition, the power supply shown in the FIGURE will accommodate a lower AC voltage such as 115 volts in a very convenient manner which will be more fully discussed herein.

The AC signal which is applied to input terminals 10 and 12 is coupled to a full wave diode rectifier circuit shown generally as 14. A large energy storage capacitor 16 is connected directly across the full wave rectifier circuit 14. The two ends of capacitor 16 may be thought of as the unregulated DC voltage input terminals to the power supply and are designated as points 18 and 20 respectively.

The power supply shown in the FIGURE comprises two series connected regulating transistors 22 and 24. It will become clear from the discussion herein that many additional regulating elements or stages may be added while still practicing the concept of the present invention. The collector electrode of transistor 22 is connected to terminal point 18. The emitter electrode of transistor 22 is connected to a terminal point 28 via diode 26 poled for current conduction in the direction of the terminal point 28. The collector electrode of transistor 24 is connected to another terminal point 30, and the emitter electrode of transistor 24 is connected to the anode electrode of another diode 32.

The collector electrode of a transistor 34 is connected to the base electrode of transistor 22. A resistor 36 and a diode 38 are connected in series between the collector electrode of transistor 22 and the emitter electrode of transistor 34. Transistor 34 also has a resistor 40 connected between the emitter electrode thereof and the base electrode. Resistor 36 in combination with diode 38 makes it possible to use transistors for the function of transistor 34 with a lower breakdown voltage than would be the case without the use of these elements. Resistor 40 provides biasing for transistor 34.

The collector electrode of a driver transistor 42 is connected to the base electrode of transistor 34 via a resistor 44. The emitter electrode of transistor 42 is connected to terminal point 20 via a resistor 46.

The regulating transistor 24 has associated therewith a transistor 48 forming a configuration similar to that provided by transistors 22 and 34. In addition, just as transistor 42 provides a driver function with regard to the configuration of transistors 22 and 34, transistor 50 provides a driver function for the configuration of transistors 24 and 48. The base electrodes of transistors 42 and 50 are connected together on a common line 52. A Zener diode 53 is connected between line 52 and terminal point 20. Line 52 is connected to the series combination of a resistor 54 and a diode 56. The anode electrode of diode 56 is connected to one end of a resistor 58. The other end of resistor 58 is connected to terminal point 18.

The collector electrode of a control transistor 60 is connected to the junction between the anode electrode of diode 56 and one end of resistor 58. The emitter electrode of transistor 60 is connected to terminal point 20. A resistor 62 is connected between the base and emitter electrodes of transistor 60. A Zener diode 64 connects the base electrode of transistor 60 to the wiper arm of a potentiometer 66. One end of potentiometer 66 is connected to terminal 20 via a resistor 68.

The other end of potentiometer 66 is connected to a terminal point 70 via the parallel combination of a resistor 72 and capacitor 74. Terminal point 70 is connected via inductor 76 to one power supply output terminal 78. The other power supply output terminal 80 is connected to terminal 20. A large energy storage capacitor 82 is connected between terminal point 70 and terminal point 20. A diode 84 is connected between terminal point 20 and the cathode electrode of diode 32.

A transformer shown generally as T1 has a primary winding P1 connected on one end to the cathode electrode of diode 32 and connected on the other end to terminal point 70. Transformer T1 has in addition two secondary windings W1 and W2. Secondary winding W1 has one end connected to the emitter electrode of the series regulating transistor 22 and the other end thereof connected to the base electrode of transistor 22 via the parallel combination of resistor 86 and capacitor 87. In addition resistor 88 is connected between the emitter and base electrodes of transistor 22. Secondary winding W2 has one end thereof connected to the emitter electrode of the series regulating transistor 24 and the other end thereof connected to the base electrode of transistor 24 via the parallel combination of resistor 90 and capacitor 91. In addition, resistor 92 is connected between the emitter and base electrodes of transistor 24.

A switching device shown generally as S1 is arranged to be operated to place the regulating elements which are normally in a series relationship to one another into a parallel relationship with respect to one another. As shown in the FIGURE, terminal point 28 which is connected to the emitter electrode of transistor 22 via diode 26 is connected through switch S1 to terminal point 30 which is connected to the collector electrode of transistor 24. When switch S1 is in the position shown in the FIGURE, the emitter electrode of transistor 24 is connected to the output terminal 78 via diode 32, the primary winding P1 and inductor 76. When the switch S1 is operated to its other position, the collector electrodes of transistors 22 and 24 are connected together via line 94 and switch S1 and the emitter electrodes of transistors 22 and 24 are connected together via their respective diodes 26 and 32 and line 96 in combination with switch S1. Thus, it will be seen that the operation of switch S1 permits the power supply shown in the FIGURE to be arranged with a plurality of regulating elements connected either in series with each other or in parallel with each other depending upon the position of switch S1.

The operation of the power supply shown in the FIGURE is as follows. An AC signal is applied to input terminals 10 and 12. This AC signal may be at 230 volts with a frequency of, say, 400 hertz. In this case it is preferable to leave switch S1 in the position shown so that each of the transistors 22 and 24 will be subjected to approximately one-half of the voltage appearing at point 18.

The rectified voltage appearing at point 18 supplies a signal via resistor 58, diode 56 and resistor 54 to the base electrodes of transistors 50 and 42. The forward base current, supplied in the manner described, places driver transistors 50 and 42 simultaneously in a saturated mode of operation. Zener diode 53 holds the base electrode driving voltage for transistors 50 and 42 at a constant level. By proper selection of the Zener diode 53, the base electrode driving voltage may be held at a constant level despite large variations in the input line voltage. The saturated state of current conduction of transistors 42 and 50 simultaneously causes transistors 34 and 48 respectively to enter into a high current conduction state. The collector current flowing in transistors 34 and 48 drives transistors 22 and 24 respectively into a current conduction state. When the output voltage rises to a magnitude equal to the pre-set upper level for the sensing network comprising resistors 72, 68 and potentiometer 66, the control transistor 60 will conduct current and will effectively remove the base electrode biasing signal from transistors 50 and 42. Then transistors 48 and 24 and transistors 34 and 22 will also be switched into a state of non-conduction. At this time the unregulated input voltage appearing across terminal points 18 and 20 has been effectively disconnected. However, the energy storage network comprising the primary winding P1 of transformer T1 and capacitor 82 continue to supply load current to the output terminals 78 and 80 via the transfer diode 84. The power supply output voltage across terminals 78 and 80 now demonstrates an exponential decay which continues until the magnitude of the output voltage reaches the lower pre-set level on the sensing network comprising resistors 72, 68 and potentiometer 66. When this lower pre-set level is reached, control transistor 60 is switched off. With control transistor 60 switched off, transistors 50 and 42 will receive base driving voltage again via resistor 58, diode 56 and resistor 54 and will once again be placed in a condition of current conduction. The cycle repeats itself over and over again while maintaining the voltage across output terminals 78 and 80 at a substantiallly constant value.

During that portion of the cycle just described when transistors 22 and 24 are starting to turn on, the primary winding P1 of transformer T1 begins to store energy as the current starts to build up. As the current flow increases a voltage is induced in winding W1 which is applied across the base-emitter electrodes of transistor 22 in such a fashion as to further bias transistor 22 toward a saturated current condition. In the same manner the voltage induced in winding W2 is applied across the base-emitter electrodes of transistor 24 in a direction to hasten the achievement of a saturated state of current conduction in transistor 24. At this point in the cycle transformer T1 is providing a regenerative feedback function. As more and more current flows through transistors 22 and 24, the induced voltages in windings W1 and W2 go higher and higher and these induced voltages help to further increase the current conduction through transistors 22 and 24.

When the cycle of operation reaches the point where transistors 22 and 24 are to go from a saturated state of current conduction to a condition of non-conduction, the voltages induced in windings W1 and W2 are reversed in polarity which helps to drive the regulating transistors 22 and 24 toward the state of non-conduction. Now, as the current decreases through transistors 22 and 24 the reverse polarity induced voltages increase so as to drive transistors 22 and 24 further and further toward the state of non-current conduction.

Thus, the circuit described and shown in the FIGURE provides a plurality of regulating elements which are simultaneously driven on by virtue of the fact that the base electrodes of the regulating transistors are effectively driven in parallel. The utilization of transformer T1 with multiple feedback windings further ensures that the regulating transistors will be operated in a manner which improves the switching efficiency of the circuit. the utilization of the switch S1 and the associated circuitry permits the user to employ the high switching efficiency of the present invention in either a high voltage, say 230 volts application, or in a low voltage, say 115 volts application by the setting of a switch.

The embodiment of the invention thus described provides an efficient power supply for providing a regulated output voltage despite wide variations of input voltage and these advantages are provided by a structure which is not complex and is enonomical to construct.

What is claimed is:

1. A power supply for providing a regulated voltage at a pair of output terminals, said power supply comprising:
   a pair of input terminals adapted for connection to a source of unregulated voltage;
   a plurality of series connected regulating devices connected in circuit with one of said input terminals, said regulating devices being simultaneously operated to switch between an on and an off state of current conduction;
   first means connected between said pair of output terminals and said plurality of regulating devices for simultaneously controlling the state of current conduction of said plurality of regulating devices for providing a predetermined voltage at said pair of output terminals; and second means connected between said plurality of regulating devices and one of said output terminals and further comprising means for providing individual voltage signals to each one of said devices for reducing the on and off switching times of said devices.

2. The power supply according to claim 1 wherein said second means comprises an energy storage device.

3. The power supply according to claim 2 wherein said energy storage device comprises a transformer having a primary winding, connected in series between said plurality of regulating devices and said one of said output terminals, and a plurality of feedback secondary windings, each one of said feedback windings being connected with a corresponding one of said plurality of regulating devices.

4. The power supply according to claim 3 further comprising switching means connected to said plurality of regulating devices for switching said devices from a series relationship to a parallel relationship with respect to each other.

5. A power supply for providing a regulated voltage at a pair of output terminals, said power supply comprising:
   a pair of input terminals adapted for connection to a source of unregulated voltage;
   a plurality of semiconductor regulating devices, each of said devices having a pair of main electrodes and a control electrode, said devices being switchable between an on and an off state of current conduction, the main electrodes of said devices being connected in a series path, one end of said series path being connected to one of said input terminals;
   driver means connected to the control electrodes of said plurality of regulating devices for simultaneously controlling the state of current conduction of said regulating devices;
   control means connected to said driver means and responsive to the voltage across said pair of output terminals for controlling the state of current conduction of said driver means for maintaining the voltage across said output terminals at a predetermined regulated value; and
   energy storage means connected between the other end of said series path and one of said output terminals and further comprising means for providing voltage signals to each of said semiconductor regulating devices for reducing the on and off switching times of said plurality of regulating devices.

6. The power supply according to claim 5 wherein said energy storage means comprises a transformer having a primary winding, connected between said other end of said series path and said one output terminal, and a plurality of feedback secondary windings, each one of said feedback windings being connected with a corresponding one of said plurality of regulating devices.

7. The power supply according to claim 6 further comprising switching means connected to said plurality of regulating devices for switching said devices from a series relationship to a parallel relationship with respect to each other.

8. A power supply for providing a regulated voltage at a pair of output terminals, said power supply comprising:
   a pair of input terminals adapted for connection to a source of AC signals;
   rectification means connected to said pair of input terminals for providing, at first and second terminals, an unregulated DC signal in response to said AC signals;
   a plurality of regulating transistors, each having two main electrodes and a base electrode, the main electrodes of said plurality of regulating transistors being connected to form a series path, one end of said path being connected to said first terminal, each of said plurality of regulating transistors being switchable between an on and an off state of current conduction;
   a plurality of driver transistors, each having two main electrodes and a base electrode, one main electrode of each of said driver transistors being connected in circuit with the base electrode of a corresponding one of said plurality of regulating transistors, the other main electrode of each of said driver transistors being connected to said second terminal, the base electrodes of each of said driver transistors being connected to a common point;
   means connected to said first terminal for providing a driving signal to said common point, said driving signal simultaneously causing said driver transistors to operate in a saturated state of current conduction;
   control means responsive to the voltage across said pair of output terminals and further comprising a control transistor having a first and second main electrode and a base electrode, the main electrodes of said control transistor being connected between said common point and said second terminal, said control transistor base electrode being responsive to one level of voltage across said output terminals for switching said control transistor on thereby removing said driving signal from said driver transistors and responsive to another level of voltage across said output terminals for switching said control transistor off; and inductive energy storage means connected between the other end of said path and one of said output terminals and further comprising means for providing signals to each of said plurality of regulating transistors for reducing the switching time of said plurality of regulating transistors.

9. The power supply according to claim 8 wherein said inductive energy storage means comprises a transformer having a primary winding connected between said other end of said series path and said one output terminal and a plurality of feedback secondary windings, each one of said feedback windings being connected to a corresponding one of said plurality of regulating transistors and poled in a direction to expedite the turning-on and turning-off of said regulating transistors.

10. The power supply according to claim 9 further comprising switching means connected to said plurality of regulating transistors for switching said regulating transistors from a series relationship to a parallel relationship with respect to each other.

11. A power supply for providing a regulated voltage at a pair of output terminals, said power supply comprising:

a pair of input terminals adapted for connection to a source of AC signals;

rectification means connected to said pair of input terminals for providing, at first and second terminals, an unregulated DC signal in response to said AC signals;

at least one regulating transistor, said at least one regulating transistor having two main electrodes and a base electrode, the main electrodes of said at least one regulating transistor forming a main current conduction path, one end of said path being connected to said first terminal, said at least one regulating transistor being switchable between an on and an off state of current conduction;

at least one driver transistor having two main electrodes and a base electrode, one main electrode of said at least one driver transistor being connected in circuit with the base electrode of said at least one regulating transistor, the other main electrode of said at least one driver transistor being connected to said second terminal, the base electrode of said at least one driver transistor being connected to a particular terminal;

means connected to said first terminal for providing a driving signal to said particular terminal, said driving signal causing said at least one driver transistor to operate in a saturated state of current conduction;

control means responsive to the voltage across said pair of output terminals and further comprising a control transistor having a first and second main electrode and a base electrode, the main electrodes of said control transistor being connected between said particular terminal and said second terminal, said control transistor base electrode being responsive to one level of voltage across said output terminals for switching said control transistor on thereby removing said driving signal from said at least one driver transistor and responsive to another level of voltage across said output terminals for switching said control transistor off; and inductive energy storage means connected between the other end of said path and one of said output terminals and further comprising means for providing voltage signals to said at least one regulating transistor for reducing the on and off switching times of said at least one regulating transistor.

12. The power supply according to claim 11 wherein said inductive energy storage means comprises a transformer having a primary winding connected between said other end of said main current conduction path and said one output terminal and at least one feedback secondary winding, said at least one feedback winding being connected to said at least one regulating transistor and poled in a direction to expedite the turning-on and turning-off of said at least one regulating transistor.

* * * * *